(12) United States Patent
Kim et al.

(10) Patent No.: US 7,651,793 B2
(45) Date of Patent: Jan. 26, 2010

(54) HIGH DENSITY RECORDING MEDIUM WITH SUPER-RESOLUTION NEAR-FIELD STRUCTURE MANUFACTURED USING HIGH-MELTING POINT METAL OXIDE OR SILICON OXIDE MASK LAYER

(75) Inventors: Joo-Ho Kim, Youngin-si (KR); Junji Tominaga, Ibaraki (JP)

(73) Assignees: Samsung Electronics Co., Ltd., Suwon-si (KR); National Institute of Advanced Industrial Science & Technology, Tokyo (JP)

( * ) Notice: Subject to any disclaimer, the term of this patent is extended or adjusted under 35 U.S.C. 154(b) by 613 days.

(21) Appl. No.: 10/529,044

(22) PCT Filed: Sep. 24, 2003

(86) PCT No.: PCT/KR03/01949

§ 371 (c)(1),
(2), (4) Date: Jan. 17, 2006

(87) PCT Pub. No.: WO2004/029936

PCT Pub. Date: Apr. 8, 2004

(65) Prior Publication Data

US 2006/0147757 A1    Jul. 6, 2006

(30) Foreign Application Priority Data

Sep. 26, 2002  (JP)  ............................. 2002-281783

(51) Int. Cl.
*G11B 11/105* (2006.01)

(52) U.S. Cl. .................... 428/824.3; 369/13.4; 720/718

(58) Field of Classification Search .................. None
See application file for complete search history.

(56) References Cited

U.S. PATENT DOCUMENTS

| 6,411,591 | B1 * | 6/2002 | Moritani et al. | 369/275.2 |
| 6,506,543 | B1 * | 1/2003 | Tseng et al. | 430/311 |
| 7,166,346 | B2 * | 1/2007 | Kim et al. | 428/64.4 |
| 7,572,496 | B2 * | 8/2009 | Kim et al. | 428/64.1 |

(Continued)

FOREIGN PATENT DOCUMENTS

JP    2000-285536    10/2000

(Continued)

OTHER PUBLICATIONS

Office Action issued in Japanese Patent Application No. 2002-281783 on Jan. 9, 2007.

(Continued)

*Primary Examiner*—Kevin M Bernatz
(74) *Attorney, Agent, or Firm*—Stein McEwen, LLP

(57) ABSTRACT

A high density recording medium with a super-resolution near-field structure including a mask layer comprising high melting point metal oxide or silicon oxide. A high density recording medium with a super-resolution near-field structure includes a sequential stack of a second dielectric layer, a recording layer, a protective layer, a mask layer, a first dielectric layer, and a polycarbonate layer, wherein the mask layer comprises high melting point metal oxide or silicon oxide to generate a near field by optically or thermally inducing physical changes in the crystalline structure and optical properties of the high melting point metal oxide or silicon oxide.

2 Claims, 4 Drawing Sheets

U.S. PATENT DOCUMENTS

| | | | |
|---|---|---|---|
| 2001/0015949 A1 | 8/2001 | Nagase et al. | |
| 2002/0154596 A1 | 10/2002 | Hsu et al. | |
| 2003/0228462 A1* | 12/2003 | Chen | 428/336 |
| 2005/0249065 A1* | 11/2005 | Kim et al. | 369/47.1 |

FOREIGN PATENT DOCUMENTS

| | | |
|---|---|---|
| JP | 2002-25138 | 1/2002 |
| KR | 2000-14590 | 3/2000 |
| WO | WO 02/35540 A1 | 5/2002 |

OTHER PUBLICATIONS

Yatsui et al., "Increasing Throughput of a Near-Field Optical Fiber Probe Over 1000 Times by the Use of a Triple-Tapered Structure", Applied Physics Letters, vol. 73, No. 15, Oct. 1998.

Fuji et al., "A Near-Field Recording and Readout Technology Using a Metallic Probe in an Optical Disk", Japanese Journal of Applied Physics, vol. 39, Part I, No. 2B, Feb. 2000, pp. 980-981.

Supplementary European Search Report issued Apr. 3, 2008 by the European Patent Office re: European Patent Application No. 0379854.3 (4 pp).

Lin, Wei Chih, et al. "Study of a super-resolution optical structure: polycarbonate/$ZnS$-$SiO_2$/$ZnOx$/$ZnS$-$SiO_2$/$Ge_2Sb_2Te_5$/$ZnS$-$SiO_2$,", *Proceedings of the IEEE*, Jul. 2002 (pp. 216-218).

Bussjager, Rebecca, et al. "Using Tungsten Oxide Based Thin Films for Optical Memory and the Effects of Using IR Combined with Blue/Blue-Green Wavelengths", *Japanese Journal Of Applied Physics*, vol. 39, Feb. 2002 (pp. 789-796).

\* cited by examiner

US 7,651,793 B2

HIGH DENSITY RECORDING MEDIUM WITH SUPER-RESOLUTION NEAR-FIELD STRUCTURE MANUFACTURED USING HIGH-MELTING POINT METAL OXIDE OR SILICON OXIDE MASK LAYER

CROSS REFERENCE TO RELATED APPLICATIONS

This application claims the benefit of Patent Cooperation Treaty Application No. PCT/KR2003/001949 filed Sep. 24, 2003 in the Korean Intellectual Property Office, which claims priority to Japanese Patent Application No. 2002-281783 filed Sep. 26, 2002 in the Japanese Patent Office.

BACKGROUND OF THE INVENTION

1. Field of the Invention

The present invention relates to a high density recording medium, and more particularly, to a high density recording medium with a super-resolution near-field structure that is manufactured using a high-melting point metal oxide or silicon oxide mask layer.

2. Description of the Related Art

Conventional recording media can be classified into magneto-optical recording media or phase change recording media. In magneto-optical recording media, such as mini disks (MDs), information is read by detecting the rotation of a straight polarized light reflected from a magnetic film according to the magnetic force and the magnetization direction of the magnetic film. The rotation of the reflected light is known as the "Kerr Effect". In phase change recording media, such as digital versatile discs (DVDs), information is read based on the difference in reflectivity due to the different absorption coefficients of an optical constant between an amorphous recorded domain and a crystalline non-recorded domain of the recording medium.

Recently, many diversified methods of recording information using micro marks (pits), as in a phase change method, and reproducing information from the recording medium regardless of the diffraction limit have been suggested. The most interested one among these methods is a recording method using a super-resolution near-field structure, which is disclosed in Applied Physics Letters, Vol. 73, No. 15, October 1998, and Japanese Journal of Applied Physics, Vol. 39, Part I, No. 2B, 2000, pp. 980-981. A super-resolution near-field structure utilizes local surface plasmon generated in its special mask layer to reproduce information. The super-resolution near-field structure is classified as an antimony (Sb) transmission type which has an antimony mask layer that becomes transparent by laser irradiation when reproducing information from the recording medium or as a silver oxide decomposition type which has a silver oxide($AgO_x$) mask layer that decomposes into oxygen and silver, which acts as a scattering source inducing local plasmon.

FIG. 1 illustrates the structure of a recording medium using a conventional super-resolution near-field structure.

As shown in FIG. 1, the recording medium includes a second dielectric layer 112-2 made of, for example, ZnS—$SiO_2$, a recording layer 115 made of, for example, GeSbTe, a protective layer 114 made of dielectric materials, for example, ZnS—$SiO_2$ or SiN, a mask layer 113 made of, for example, Sb or $AgO_x$, a first dielectric layer 112-1 made of, for example, ZnS—$SiO_2$ or SiN, and a transparent polycarbonate layer 111, which are sequentially stacked upon one another.

When the mask layer 113 is made of Sb, SiN is used for the protective layer 114 and the first dielectric layer 112-1. When the mask layer 113 is made of $AgO_x$, ZnS—$SiO_2$ is used for the protective layer 114 and the first dielectric layer 112-1. The protective layer 114 prevents reaction between the recording layer 115 and the mask layer 113 and is a site upon which a near field acts when reproducing information. When reproducing information, Sb of the mask layer 113 becomes transparent, and $AgO_x$ of the mask layer 113 decomposes into oxygen and silver, which acts as a scattering source inducing local plasmons.

The recording medium is irradiated with a laser beam of about 10-15 mW emitted from a laser source 118 through a focusing lens (not shown) to heat the recording layer 115 above 600 C so that a laser-irradiated domain of the recording layer 115 becomes amorphous and has a smaller absorption coefficient k of an optical constant (n, k), regardless of the change of refractive index n of the optical constant (n, k). In an irradiated domain of the Sb or $AgO_x$ mask layer 113, the crystalline structure of Sb changes or $AgO_x$ irreversibly decomposes, thereby acting as a scattering source which generates plasmon with the result that light of a shorter wavelength than the radiated laser beam is generated. The protective layer 114 serves as a super-resolution near-field toward the recording layer 115. As a result, it is possible to reproduce information recorded on the recording medium as micro marks which are smaller in size than a diffraction limit of the laser used. Therefore, it becomes possible to reproduce information recorded in a high density recording medium using such a super-resolution near-field structure regardless of a diffraction limit of the laser used.

However, in recording media having such a super-resolution near-field structure, their mask layer and recording layer have similar transition temperatures, so ensuring thermal stability during information reproduction is considered as being important. Furthermore, such a super-resolution near-field structure results in poor noise characteristics.

SUMMARY OF THE INVENTION

The present invention provides a high density recording medium with a super-resolution near-field structure that ensures improved thermal stability and noise characteristics during information reproduction therefrom, by adopting a mask layer comprising a high-melting point metal oxide or silicon oxide.

In accordance with an aspect of the present invention, there is provided a high density recording medium with a super-resolution near-field structure including a sequential stack of a second dielectric layer, a recording layer, a protective layer, a mask layer, a first dielectric layer, and a polycarbonate layer, wherein the mask layer comprises high melting point metal oxide or silicon oxide to generate a near field by optically or thermally inducing physical changes in the crystalline structure and optical properties of the high melting point metal oxide or silicon oxide.

A super-resolution near-field high density recording medium according to the present invention that offers effective thermal stability and improved noise characteristics during reproduction may be realized with the mask layer comprising high melting point metal oxide or silicon oxide.

A super-resolution near-field high density recording medium according to the present invention that offers effective thermal stability and improved noise characteristics during reproduction may be realized with a mask layer comprising $WO_x$ as a high melting point metal oxide showing reversible physical changes.

A super-resolution near-field high density recording medium according to the present invention that offers effective thermal stability and improved noise characteristics during reproduction may be realized with a mask layer comprising $TaO_x$ or $AuO_x$ as a high melting point metal oxide showing irreversible physical changes.

A super-resolution near-field high density recording medium according to the present invention that offers effective thermal stability during reproduction may be realized with a mask layer comprising $SiO_x$ as a silicon oxide showing irreversible physical changes.

A super-resolution near-field high density recording medium that offers effective thermal stability and improved noise characteristics during reproduction may further include a reflective layer comprising silver (Ag) or aluminum(Al) below the second dielectric layer.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DESCRIPTION OF THE PREFERRED EMBODIMENTS

Figure 1A:
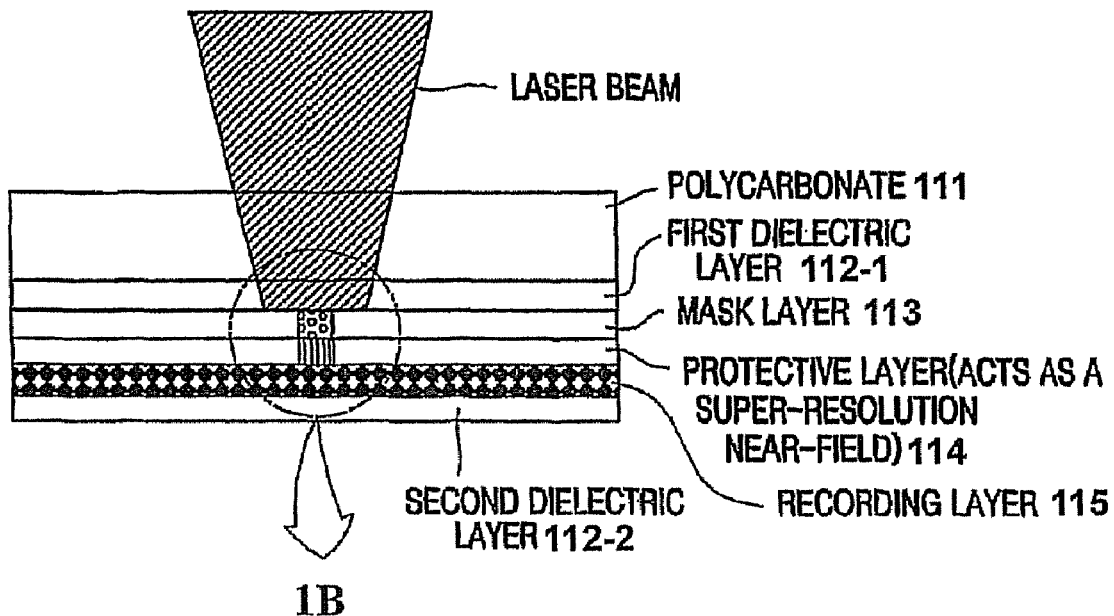
FIG. 1A illustrates a high density recording medium with a conventional super-resolution near-field structure.
Figure 1B:
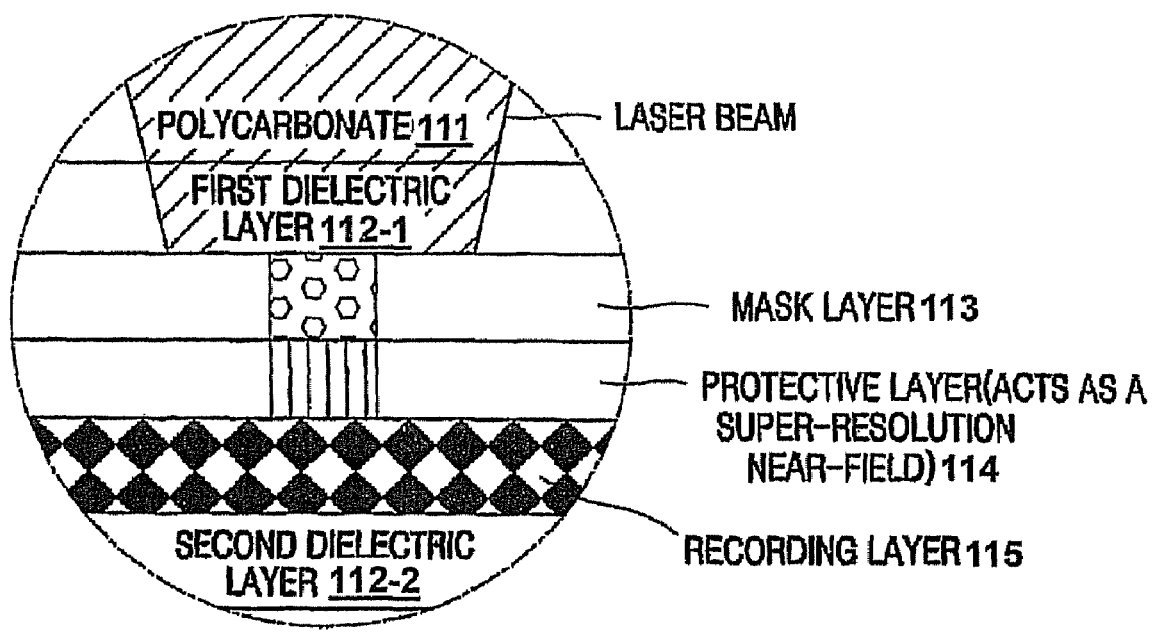
FIG. 1B illustrates a portion of the high density recording medium shown in FIG. 1A.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2A:
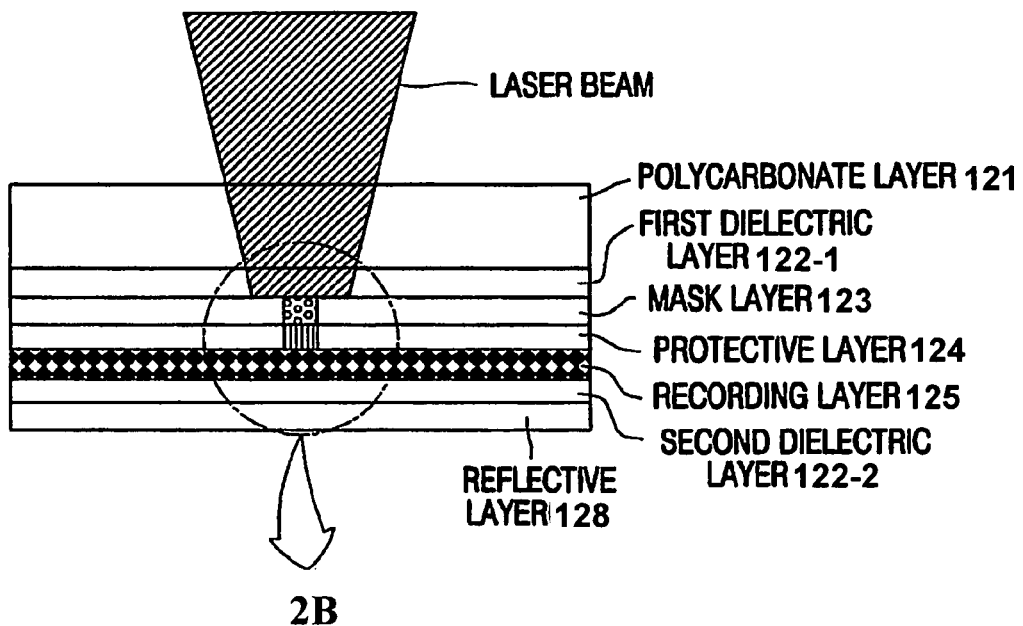
FIG. 2A illustrates a high density recording medium with a super-resolution near-field structure according to an embodiment of the present invention.
Figure 2B:
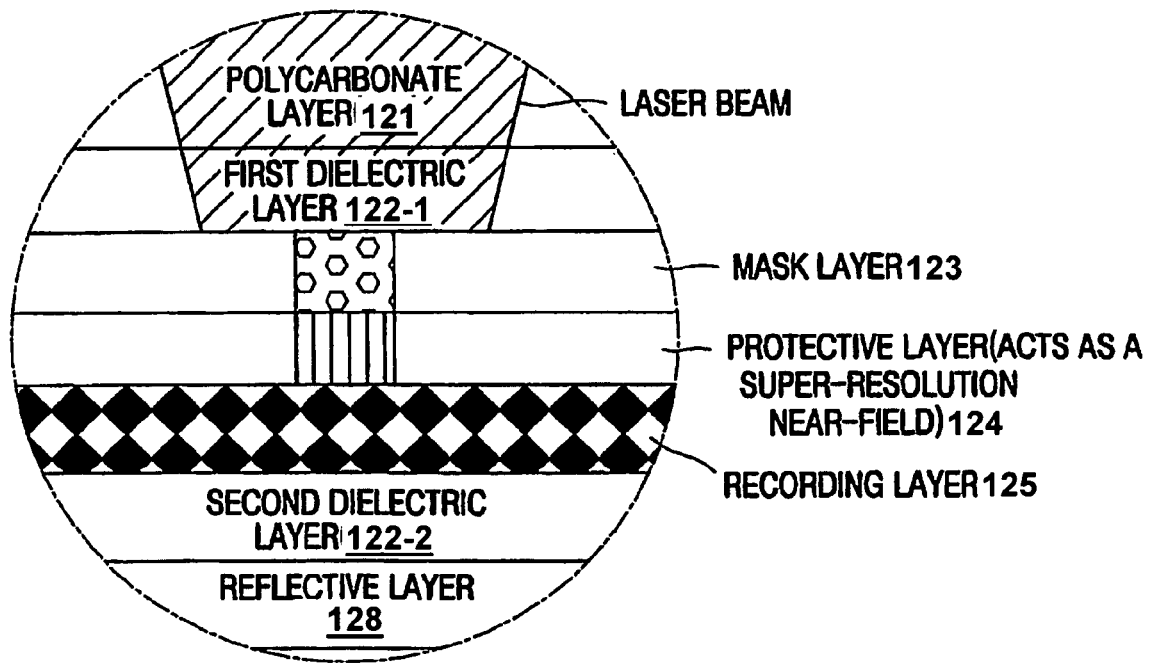
FIG. 2B illustrates a portion of the high density recording medium shown in FIG. 2B.

FIG. 2 illustrates a high density recording medium with a super-resolution near-field structure according to an embodiment of the present invention. The high density recording medium of FIG. 2 includes a reflective layer made of silver (Ag) or aluminum(Al), a second dielectric layer 122-2 made of, for example, $ZnS$—$SiO_2$, a recording layer 125 made of, for example, GeSbTe, a protective layer 124 made of a dielectric material, for example, $ZnS$—$SiO_2$/SiN, a mask layer 123, a first dielectric layer 122-1 made of, for example, $ZnS$—$SiO_2$/SiN, and a transparent polycarbonate layer 121, which are sequentially stacked upon one another.

The mask layer 123 is made of one of high-melting point metal oxide and silicon oxide. Examples of high-melting point metal oxide includes $WO_x$ which shows nearly reversible physical changes for improving thermal stability and noise characteristics during reproduction from the recording medium and $TaO_x$ or $AuO_x$ which exhibits irreversible physical changes and effectively improves noise characteristics. An example of silicon oxide is $SiO_x$ which leads to irreversible physical changes and effectively improves noise characteristics.

The protective layer 124 prevents reactions between the recording layer 125 and the mask layer 123 and serves as a site where a super-resolution near-field acts upon during reproducing information. In addition, the mask layer 123 acts as a scattering source for generating local plasmon through its physical changes in crystalline structure and optical properties.

The reflective layer 128 made of Ag or Al is for inducing physical changes in the crystalline structure and optical properties of the recording layer 125 which faces away from the incident laser beam side and the second dielectric layer 122-2 to occur nearly as much as those of the upper portion of the recording layer 125 which faces the incident laser beam side and the first dielectric layer 122-1.

Hereinafter, the mask layer 124 is described as being made of $WO_x$ which shows nearly reversible physical changes.

When the recording medium is irradiated through a focusing lens (not shown) with a laser beam having a wavelength of about 405 nm emitted from a laser source (not shown) with a power of about 11 mW to heat the recording medium 125 above 600 C, the laser irradiated domain of the recording medium becomes amorphous and have a reduced absorption coefficient k of an optical constant (n, k), regardless of the change of refractive index n. In the laser irradiated domain of the $WO_x$ mask layer, plasmon are generated due to the physical changes in its crystalline structure and optical properties, which occur as a result of the reversible reaction, expressed by $4WO_3 \rightleftharpoons 2W_2O_5+O_2$, in the $WO_x$ mask layer, so that light having a shorter wavelength than the initially radiated laser beam is emitted. In addition, the protective layer 124 serves as a super-resolution near-field toward the recording layer 125. As a result, it is possible to reproduce information recorded on the recording medium as micro marks which are smaller in size than a diffraction limit of the laser used. Therefore, it becomes possible to reproduce information recorded in a high density recording medium using such a super-resolution near-field structure regardless of a diffraction limit of the laser used.

Figure 3:
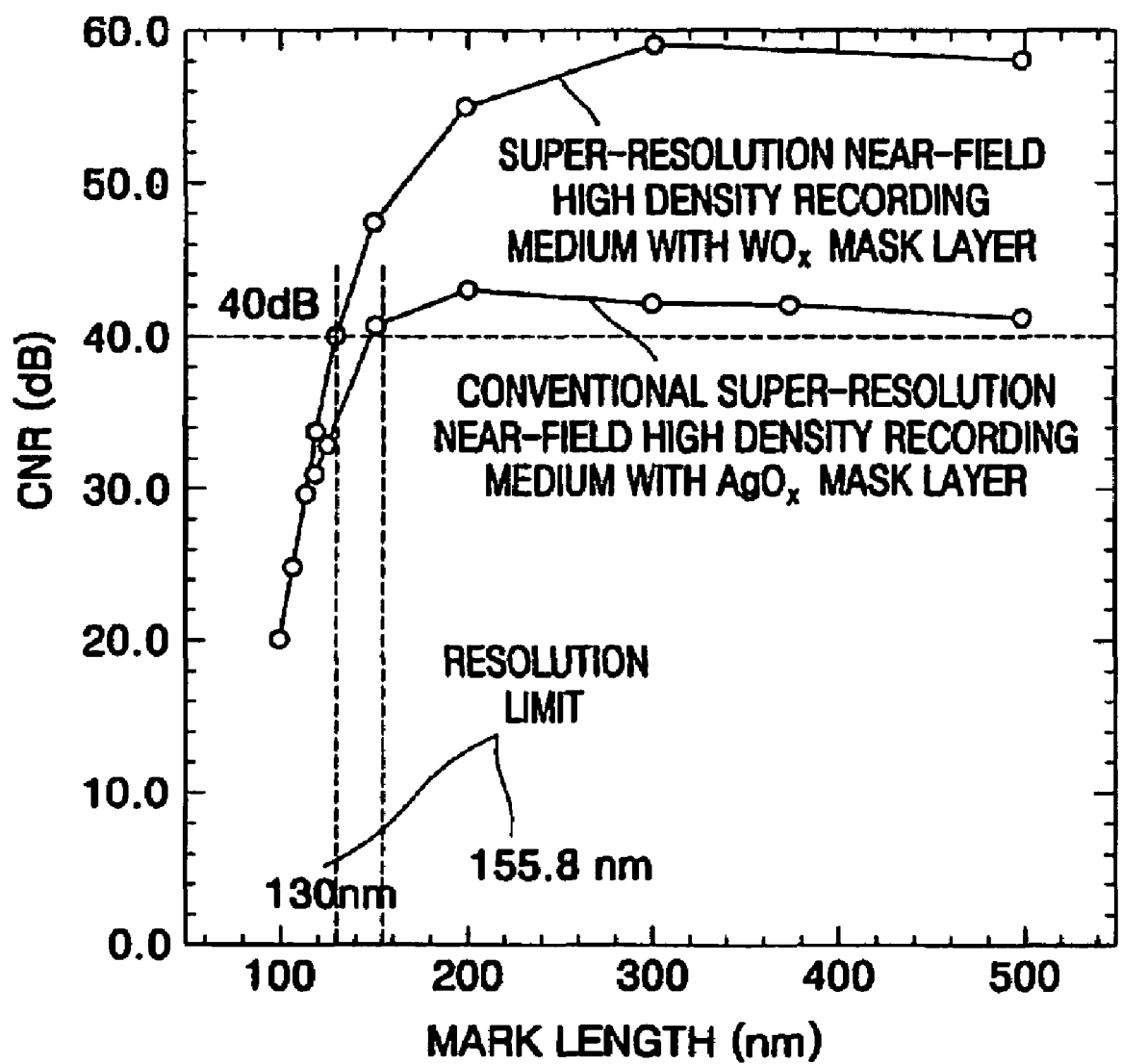
FIG. 3 is a gram of carrier to noise ratio (CNR) versus mark length, for the recording medium according to the present invention and the conventional one.

FIG. 3 is a graph of carrier to noise ratio (CNR) versus mark length, for high-density recording media with a super-resolution near-field structure according to the present invention and conventional one. For both the high-density recording media, a 405-nm laser beam was radiated at a power of 11 mW through a lens having a numerical aperture (NA) of 0.65 at a rate of 3 m/sec to record data, and the same laser beam but at a power of 4 mW was radiated under the same conditions as for the recording, to reproduce data. Referring to the results in FIG. 3, the resolution limit mark length at a CNR of 40 dB is 155.8 nm for the conventional super-resolution near-field high density recording medium with a $AgO_x$ mask layer and 130 nm for the super-resolution near-field high density recording medium with the $WO_x$ mask layer according to the present invention. This result indicates that higher density recording can be achieved with the super-resolution near-field high density recording medium according to the present invention than the conventional one under the same conditions.

Figure 4:
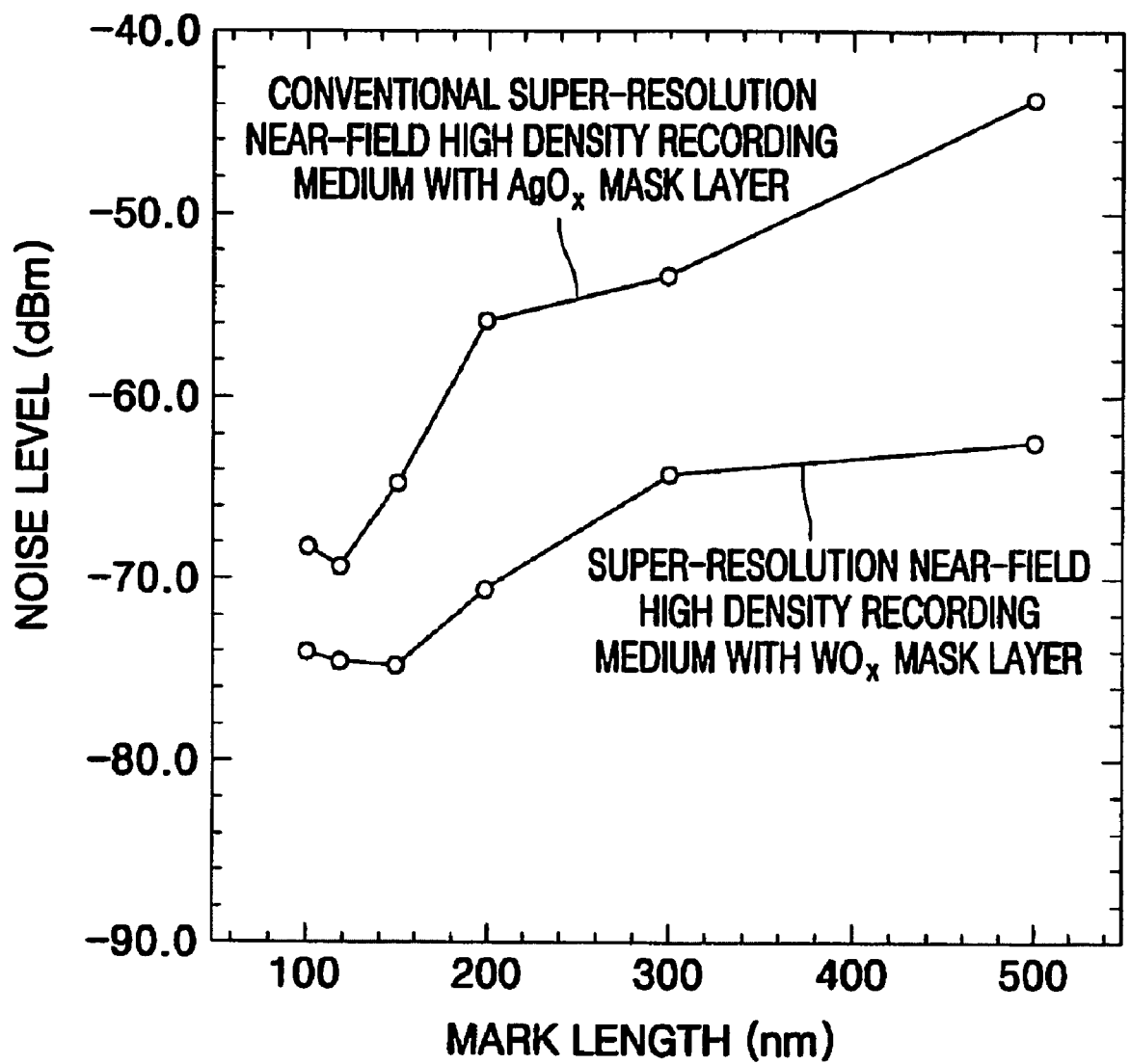
FIG. 4 is a graph of noise level versus mark length, for the recording medium according to the present invention and the conventional one.

FIG. 4 is a graph of noise level versus mark length, for the super-resolution near-field high density recording medium according to the present invention and the conventional one. The results of FIG. 4 were obtained as a result of experimentations under the same conditions as for the results of FIG. 3. As is apparent from FIG. 4, the noise level of the conventional super-resolution near-field high density recording medium with the $AgO_x$ mask layer is −65 dBm, and the noise level of the super-resolution near-field high density recording medium with the $WO_x$ mask layer according to the present invention is −76 dBm. This result indicates that the super-resolution near-field high density recording medium according to the present invention offers more effective noise characteristics than the conventional one.

With a super-resolution near-field high density recording medium having a high melting point metal oxide or silicon oxide mask layer according to the present invention, thermal stability and noise characteristics during reproduction are improved.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A high density recording medium with a super-resolution near-field structure including a sequential stack of a second dielectric layer, a recording layer, a protective layer, a mask layer, a first dielectric layer, and a polycarbonate layer, wherein the mask layer comprises $WO_x$ to generate a near field by optically or thermally inducing physical changes in the crystalline structure and optical properties of the $WO_x$.

2. The high density recording medium of claim 1, further comprising a reflective layer containing silver or aluminum disposed on an opposite side of the second dielectric layer from the recording layer.

* * * * *